(12) United States Patent
Duffy et al.

(10) Patent No.: US 9,703,984 B2
(45) Date of Patent: Jul. 11, 2017

(54) ONE WAY AND TWO WAY DATA FLOW SYSTEMS AND METHODS

(71) Applicant: Carney Labs LLC, Alexandria, VA (US)

(72) Inventors: Brian David Duffy, Washington, DC (US); John Sloan Carney, Alexandria, VA (US); Jesse Cole English, Columbia, MD (US)

(73) Assignee: MARI LLC, Alexandria ( * ) Notice: Subject to any disclaimer, the term of this patent is extended or adjusted under 35 U.S.C. 154(b) by 0 days.

(21) Appl. No.: 14/802,759

(22) Filed: Jul. 17, 2015

(65) Prior Publication Data

US 2016/0132695 A1   May 12, 2016

Related U.S. Application Data

(60) Provisional application No. 62/060,440, filed on Oct. 6, 2014.

(51) Int. Cl.

| G06F 21/00 | (2013.01) |
| G06F 21/62 | (2013.01) |
| G06F 17/30 | (2006.01) |
| G06Q 30/02 | (2012.01) |

(52) U.S. Cl.
CPC ......... G06F 21/6245 (2013.01); G06F 17/30 (2013.01); G06Q 30/0201 (2013.01)

(58) Field of Classification Search
None
See application file for complete search history.

(56) References Cited

U.S. PATENT DOCUMENTS

| 5,806,069 | A | * | 9/1998 | Wakiyama | ....... G05B 19/41865 |
| 5,978,771 | A | * | 11/1999 | Vandivier, III | .. G06Q 10/06315 |
| | | | | | 700/99 |
| 6,253,203 | B1 | * | 6/2001 | O'Flaherty | ......... G06F 21/6245 |
| 6,268,850 | B1 | | 7/2001 | Ng | |
| 6,735,570 | B1 | * | 5/2004 | Lacy | ................ G06Q 10/06311 |
| | | | | | 705/7.14 |
| 7,219,234 | B1 | * | 5/2007 | Ashland | ................ G06F 21/604 |
| | | | | | 709/216 |
| 7,930,298 | B2 | | 4/2011 | Ku et al. | |

(Continued)

OTHER PUBLICATIONS

International Search Report issued in PCT/US2015/040973 mailed Oct. 30, 2015.

*Primary Examiner* — Maung Lwin
(74) *Attorney, Agent, or Firm* — DLA Piper LLP US

(57) ABSTRACT

A system may include a database, a processor coupled to the database, and a user module executed by the processor. The user module may be configured to receive a value for an attribute of a user and determine whether the value is derived from an assessment sponsored by an organization associated with the user. When the value is derived from the assessment sponsored by the organization associated with the user, the user module may store the received value in the database in a record associated with the user only and in a record associated with the organization and the user. When the value is derived from the assessment not sponsored by an organization associated with the user, the user module may store the received value in the database in the record associated with the user only.

46 Claims, 11 Drawing Sheets

(56) References Cited

U.S. PATENT DOCUMENTS

| | | | |
|---|---|---|---|
| 8,443,189 B2* | 5/2013 | Li | G06F 21/577 713/150 |
| 8,751,540 B2 | 6/2014 | Sappinen | |
| 8,874,685 B1* | 10/2014 | Hollis | H04L 41/00 709/206 |
| 2001/0056460 A1* | 12/2001 | Sahota | H04N 21/4782 709/201 |
| 2002/0059183 A1 | 5/2002 | Chen | |
| 2003/0051171 A1* | 3/2003 | Pearson | G06Q 30/02 726/4 |
| 2004/0221118 A1* | 11/2004 | Slater | G06F 21/10 711/163 |
| 2006/0005036 A1* | 1/2006 | Hu | G06Q 40/02 713/182 |
| 2006/0242004 A1* | 10/2006 | Yaskin | G06Q 10/06 705/7.38 |
| 2007/0192314 A1* | 8/2007 | Heggem | G06Q 30/02 |
| 2008/0016117 A1* | 1/2008 | Fernandez | G06F 19/28 |
| 2008/0162259 A1* | 7/2008 | Patil | G06Q 30/02 705/7.29 |
| 2009/0319326 A1* | 12/2009 | Yamada | G06Q 10/06 705/7.42 |
| 2010/0299277 A1* | 11/2010 | Emelo | G06Q 50/20 705/319 |
| 2011/0238482 A1* | 9/2011 | Carney | G06F 17/30867 705/14.36 |
| 2012/0053988 A1* | 3/2012 | Short | G06Q 10/063 705/7.29 |
| 2012/0054826 A1* | 3/2012 | Asim | G06F 21/6245 726/1 |
| 2013/0041923 A1* | 2/2013 | Sappinen | G06Q 10/0639 707/792 |
| 2013/0151311 A1* | 6/2013 | Smallwood | G06Q 30/0202 705/7.31 |
| 2014/0090049 A1* | 3/2014 | Friedlander | G06F 21/31 726/16 |
| 2014/0207531 A1 | 7/2014 | Kay | |
| 2014/0282977 A1 | 9/2014 | Madhu et al. | |
| 2014/0344571 A1* | 11/2014 | Adam | H04L 63/0428 713/165 |

* cited by examiner

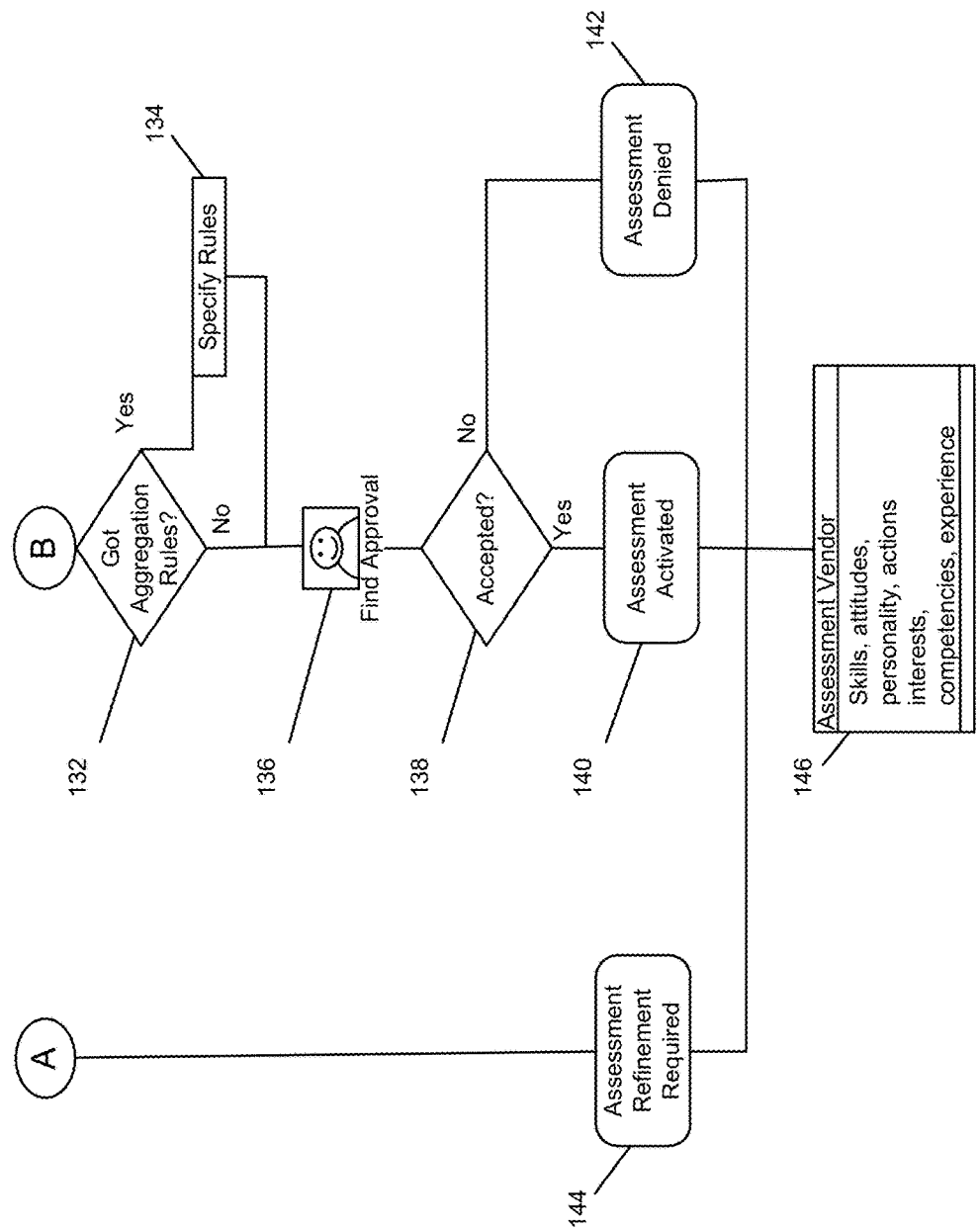

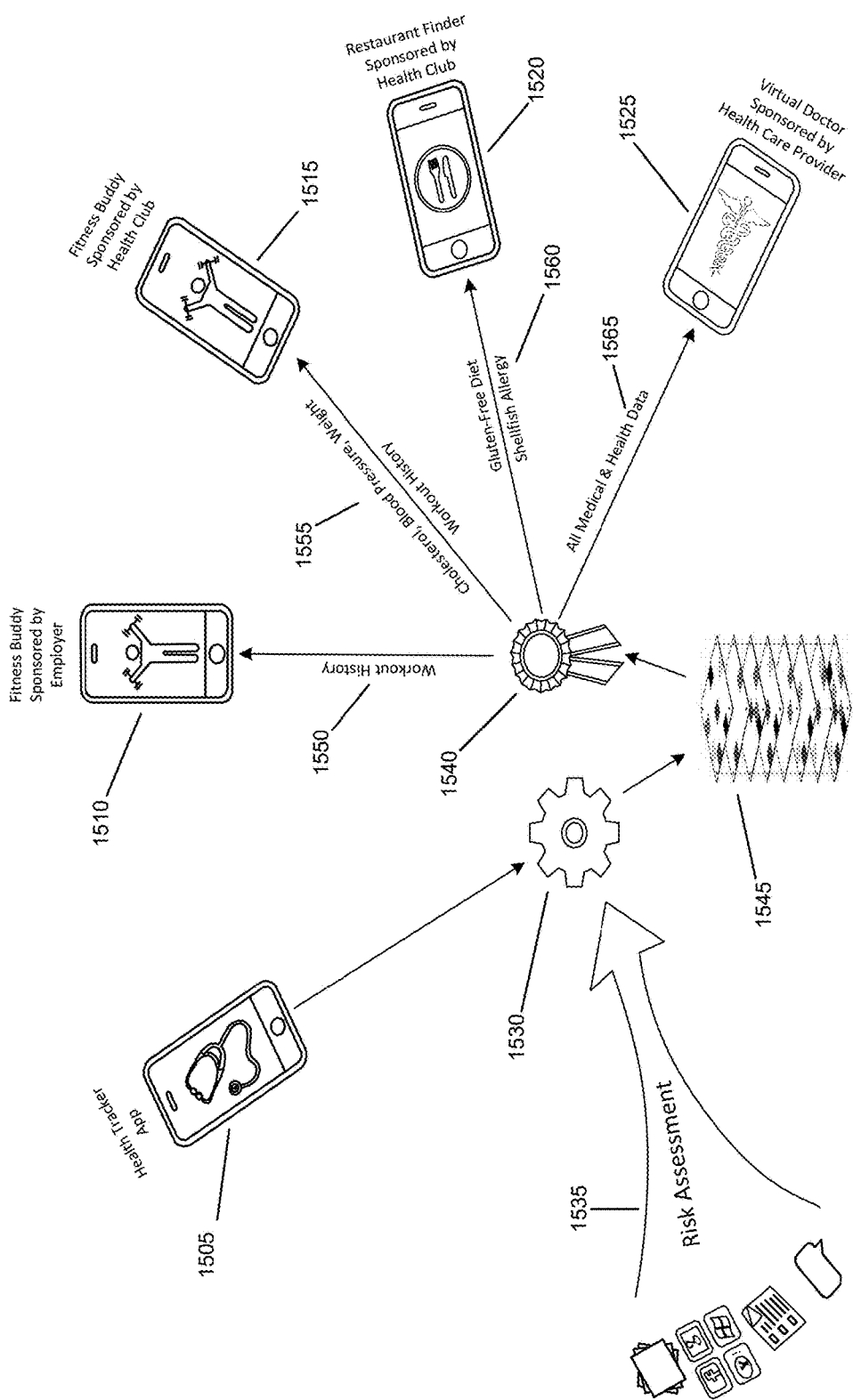

ONE WAY AND TWO WAY DATA FLOW SYSTEMS AND METHODS

CROSS REFERENCE TO RELATED APPLICATIONS

This application claims priority to U.S. Provisional Patent Application No. 62/060,440 filed Oct. 6, 2014, the entire contents of which are hereby incorporated by reference.

BRIEF DESCRIPTION OF THE DRAWINGS

FIGS. 4A and 4B are a flowchart illustrating a process for registering a new assessment instrument according to an embodiment of the invention.

FIG. 9 is a block diagram describing permission settings control data sharing according to an embodiment of the invention.

DETAILED DESCRIPTION OF SEVERAL EMBODIMENTS

Figure 1:
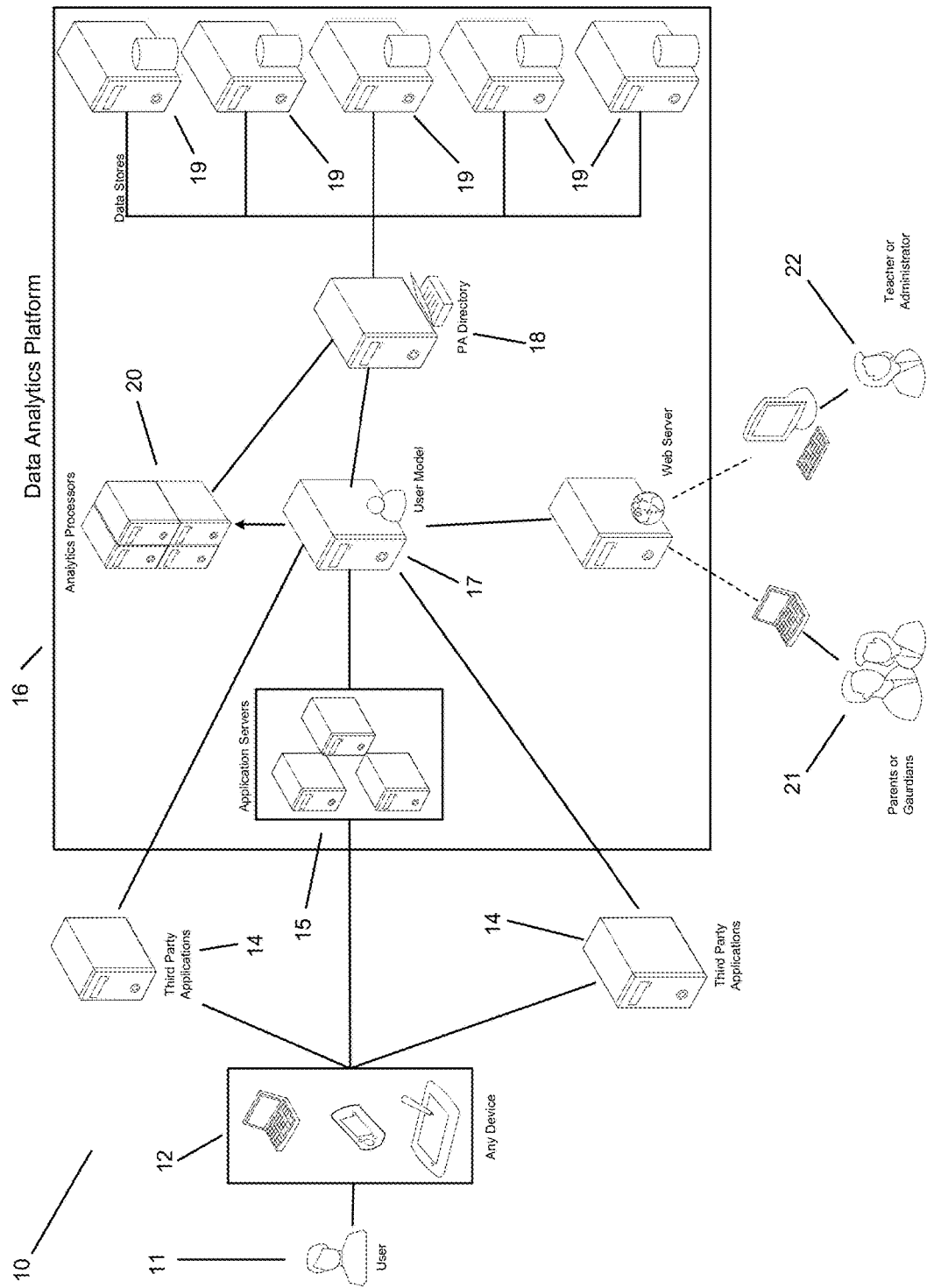
FIG. 1 is a diagram of a system according to an embodiment of the invention.

Systems and methods described herein may provide a comprehensive, universally accessible digital profile system that may capture, organize, store, and distribute detailed information about participating users in a secure manner. The system may form a detailed centralized user model that may describe a wide variety of personal attributes for each participating user, such as demographics, physical characteristics, personality traits, interests, attitudes, aptitudes, skills, competencies, activities, recommended actions, and historical events. The system may provide an authorized third-party application access to portions of the user's information when needed while still preserving the user's privacy. The system may be dynamic and automatically expandable such that virtually any type of data may be captured and later aggregated to adapt to a user's permissions and/or privacy settings.

Authorized third-party data consumers, or third-party applications, may access users' data (for example via a pass code scheme), however users may maintain control over their own data and may set multi-tiered privacy filters that may automatically aggregate or mask their data prior to release to specific third-party data consumers. The users may choose to opt-in or opt-out of data sharing opportunities on a case-by-case basis if desired. Each user may have a unique, private identifier, similar to the way hardware devices receive a unique IP address, that is connected to their stored data. Third-parties do not have access to the user's private identifier, however they may still have access to portions of the user's data. An intermediate, unique pass code system may interpret private identifiers and generate temporary pass codes that link portions of the user's data to the requesting third-party application for short periods of time. When the third-party application's transaction completes (e.g., the third-party application has received and/or submitted data), the temporary pass code may be voided so that the third-party application no longer has access to the user's data. Because the third-party application may be kept unaware of the user's private identifier and may only access the data via the special intermediate pass code system, the system may have control over when and what kind of data may be accessed.

Furthermore, the original applications that capture the data may have the ability to leverage captured data from other applications in order to better tailor each user's experience using data that, while valuable to have, might be difficult for the applications to derive themselves. For instance, many applications could benefit greatly from knowing what a user's English reading level is at the beginning of the application session. However, an application developer may not have the domain knowledge and expertise to create their own effective reading level assessment. Moreover, users may not appreciate having to take a reading level assessment each time they start a new application. A small number of reading experts may instead develop a sound, research-based reading level assessment tool that may be used to assess a user's reading level once (or periodically, perhaps every 6 months). The results of that reading assessment may then be stored in the user's personal attribute record and shared with other user-trusted applications that may leverage the reading level data without needing to know exactly how the reading assessment determined the reading level. In that way, each application may know each user's reading level at the start of each session and adapt the presentation of textual information accordingly.

The pass code mapping (e.g., between user identifiers and temporary pass codes) coupled with data privacy and aggregation tools, according to some embodiments of the invention, may provide a solid, commercially viable, and reliable source of detailed user model information that gives the individual data owner the choice of when and how to share their own data. In addition, third-party applications may also be data providers, thus allowing the underlying user model to continue to grow with use. As the data grows, the accuracy of data contained within the model may continue to increase in overall accuracy. User profile data may be managed using one-way data gates and optional two-way gates that may allow such data to be captured, stored, and leveraged for the benefit of the user it describes while protecting the user's actual identity and privacy, and while also ensuring that applications and organizations that invest in users may still access the data they captured.

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. For example, though the term "server" may appear in the following specification, the disclosed embodiments are not limited to servers.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connection). Connections between computers may use any protocols, including connection oriented protocols such as TCP or connectionless protocols such as UDP. Any connection through which at least two computers may exchange data may be the basis of a network.

Profile System

FIG. 1 illustrates the relationship between the components of a digital profile system 10 according to an embodiment of the invention. The system 10 may allow users to connect to a variety of applications which may be hosted on servers 15 within a data analytics platform 16 or externally on third-party servers 14. Users may connect to these applications using virtually any device 12 they desire. For example, computers such as desktop PCs, laptops, smartphones, tablets, etc. may be used. The user may have a profile including personal data. When the applications are launched, they may request a portion of the user's individual profile for the purposes of tailoring the user experience to meet each specific user's preferences, tendencies, and learning styles, for example.

In some embodiments, the user profile 17, also called the "user model" herein, may be the central data management component of the system 10. The user model 17 may act as a secure repository to store information about all aspects of a user's skills, knowledge, personality, demographics, interests, aptitude, attitudes, and behaviors, collectively known as personal attributes. One or more user model servers 17 may manage the user's data while one or more personal attribute (PA) directory servers 18 and data store servers 19 may control the database files that contain portions of the user data.

In order to retrieve a user's data, the application may first gain access to a temporary pass code that may be used to identify the user for a brief period without actually letting the application know who the user actually is. In the case of applications 15 that may be hosted within the platform 16, the user model processor 17 may automatically generate a temporary pass code and send the pass code to the application 15 during the application launch sequence. The application may use that pass code to access a portion of the user's personal profile data.

In the case of an application that may be launched from a third party server 14 outside the platform 16, the application may request a temporary passcode by redirecting the user to a function within the user model 17 that allows the user to login to the platform 16 and then pass the temporary pass code back to the application 14. Once the application 14 receives the temporary pass code, it may use the pass code to retrieve a portion of the user's digital profile. The temporary pass code may also be used when the application 14 wishes to store new observations about a user in that user's personal profile (user model) 17. Data that is received from an application may be stored in one of the data stores 19 based on location information managed by the PA directory server 18.

The user model server 17 may be responsible for handling activities related to managing the user model that approximates the actual user by maintaining many individual PAs that describe many aspects of the user. For security reasons, the individual PAs may be spread across multiple data stores on different physical servers 19 and may be identified by non-descriptive coded identifiers. For example, the identifiers may have the form of sixteen alpha numeric characters split into four groups of four characters. In this way, they may look similar to traditional Internet Protocol (IP) addresses. There may be no predictable pattern that identifies which server contains which PA. Instead, a central PA directory server 18 may keep track of which data store 19 actually contains each PA.

Using this scheme may ensure the security and privacy of user data, since the data stores 19 may only contain a list of encoded user IDs and encoded PA IDs. In the event of any type of malicious activity on a data store 19, only numeric data with no descriptive context will be available. The PA directory server 18 may only know the names of the PAs as a collection of coded identifiers (e.g., sixteen character strings) and pointers to individual data stores 19. The user model server 17 may only retain user data for very short periods as the data is marshalled in and out of the data stores 19 via the PA directory server 18. Consequently, there may generally be no persistent information available to any potential intruder in the user model server 18.

Registering an Application

Figure 4A:
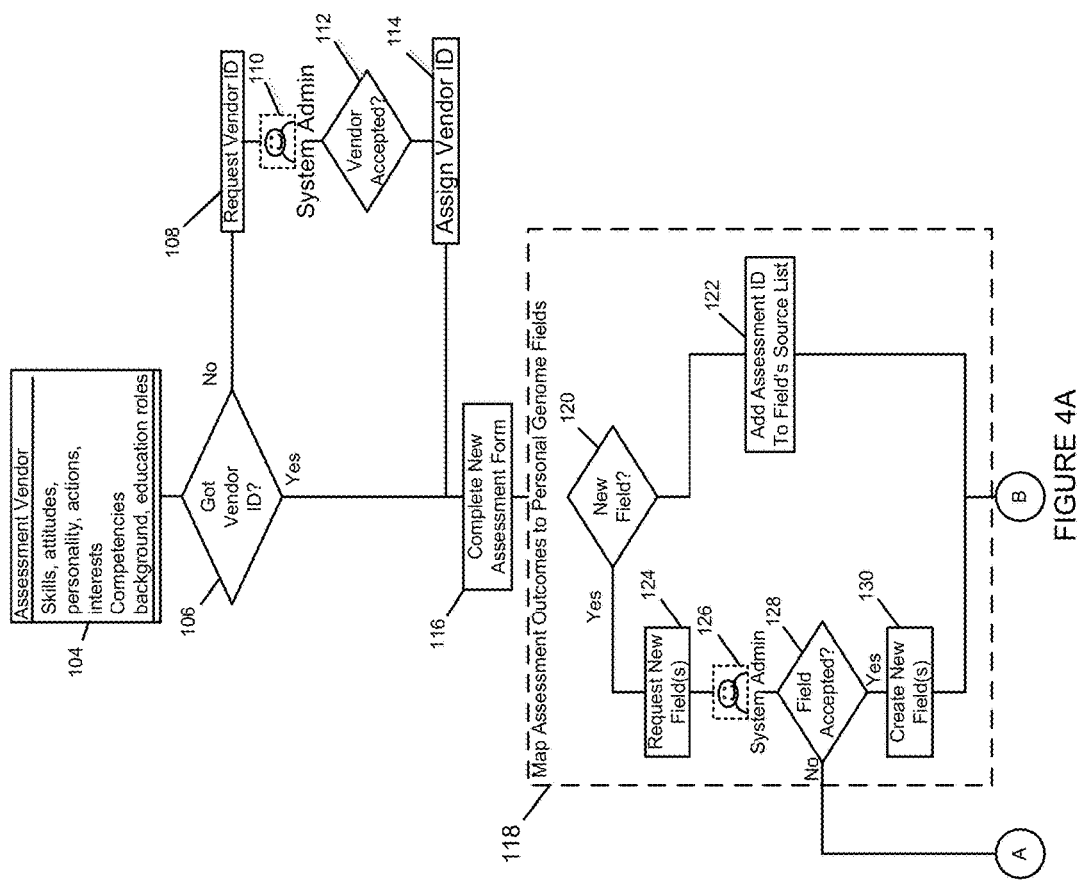

FIGS. 4A-4B illustrate a process for registering a new application 14. As described above, applications 14, 15 may be used to extend and update the user model 17. New applications 14, 15 may be registered within the system 10 to describe the types of attributes being assessed and to incorporate the results of the assessments and observations with existing or new personal attributes. As soon as an application is registered, assessment results may be stored in any user's personal user model 17, and third-party applications 14 may immediately begin to use the new attribute information.

The registration process may begin at 104 when a third-party application 14 or its associated vendor contacts a vendor support web site operated by the system 10. In some embodiments, all vendors must have a registered vendor ID to participate in the system 10. This vendor ID may be used to provide background information to users 11 who wish to control which vendors may see their personal attribute data and may be associated with specific privacy filter rules and aggregation filter rules for the vendor. At 106, the system 10 may determine if the vendor has a vendor ID. If the vendor does not yet have a vendor ID, one may be requested at 108, for example by completing a vendor application form on a vendor support web site operated by the system 10. At 110, a system administrator may review the vendor's request for completeness and acceptability. The system administrator may accept the vendor's request as is, return it for more information or clarification, or may reject the application out right. If the vendor's request is accepted, as determined at 112, a unique vendor ID may be issued and stored in the system's user model processor 17 at 114. The vendor ID may be submitted along with every data request so that the system 10 may confirm that the requesting vendor remains in active status and so that user's privacy filters may adequately control the types of data being presented to the vendor.

At 116, the vendor may complete and submit a new assessment form. Each individual assessment may be defined separately so that the system 10 may determine how the assessment relates to existing personal attributes or if new personal attributes are appropriate.

A sub process 118 may be performed to map assessment outcomes to personal attributes. The vendor may provide information about each assessment outcome value and how they think those outcomes relate to the existing attribute structure. Since assessments may have more than one outcome, each outcome may be processed separately in an iterative manner. The system 10 may perform the sub process 118 until all outcomes have been processed and mapped. In some embodiments, each outcome may be processed concurrently. In addition, in some embodiments, such processing may involve all other personal attributes of the user model 17 connected with enabling relations specified in the analytics processors 20.

At 120, the system 10 may determine if the outcome requires a new attribute. If a new attribute is not required, the outcome may be added to a list of sources that affect an existing personal attribute at 122. If a new attribute is required, the vendor may request a new attribute at 124 and identify the characteristics of the proposed new attribute so that a new personal attribute may be created. A system administrator may review the request for a new personal attribute at 126 to ensure that no existing attributes may be used to capture the assessment outcome. The system administrator may accept the need for a new personal attribute, identify existing personal attributes that are adequate to capture the assessment outcome, or return the request to the vendor for further clarification at 128. If the new attribute request is accepted, the system administrator may create a new attribute at 130, which may be immediately available in the analytics processors 20, applications 14, 15, and to all user models 17 at the end of the registration process.

Many assessment outcomes may require aggregation rules to be applied in order to present aggregated information to third-party applications 14 without actually handing out the user's raw scores on the assessment. The system 10 may determine if aggregation rules are necessary at 132. If aggregation rules are to be applied, the vendor and/or the system administrator may load them into the user model processor 17 via the system's vendor support web site at 134. A final review and approval process may be performed at 136 to ensure that everything is setup correctly. At 138, the application 14 may be accepted or the system administrator may deny activation of the application 14.

If the assessment is accepted, an assessment ID may be activated at 140 and outcomes may begin to be captured. If the assessment has been rejected, an appropriate message may be prepared for the vendor at 142. If refinement is required, as determined at 128, an appropriate message may be prepared for the vendor at 144. A final status of the assessment request and any prepared messages may be sent back to the vendor at 146.

One-Way Data Flow

The system 10 may provide one-way and/or two-way data flows. As discussed above, the system 10 may serve as a repository for PAs that describe particular individuals and may deliver portions of those PAs to computer applications that may leverage the data to provide better user experiences that are tailored to each user. When an application wishes to participate as a partner application with the system 10, that application's developer may register the application and declare which PAs the application will read and write. Although there are many thousands of PAs which may be defined, each application may be restricted to only those PAs that may logically be considered of interest to the particular domain of the requesting application.

To that end, each participating application 14 may create and implement a "read contract" and a "write contract" which may define which PAs will be read and written respectively as a result of launching the application. During the registration process (e.g., the process of FIG. 4A-4B described above), the validity of the requested read elements may be verified by a human data administrator who verifies that the requested data is actually pertinent to the application's purpose and functionality. Furthermore, the actual identity of each user may be shielded from the requesting application by preventing all personally identifiable information from being transmitted to the requesting application and by aggregating certain data elements in a manner that may produce a highly accurate and meaningful approximation of the actual user without providing actual values that could be used to identify the individual user. Temporary access tokens may be used in place of personally identifiable information and those access tokens may not persist across sessions of the same application. Consequently, gaining an access token during one session of an application's use is of no value to that application, or any other application, at a later time.

Figure 5A:
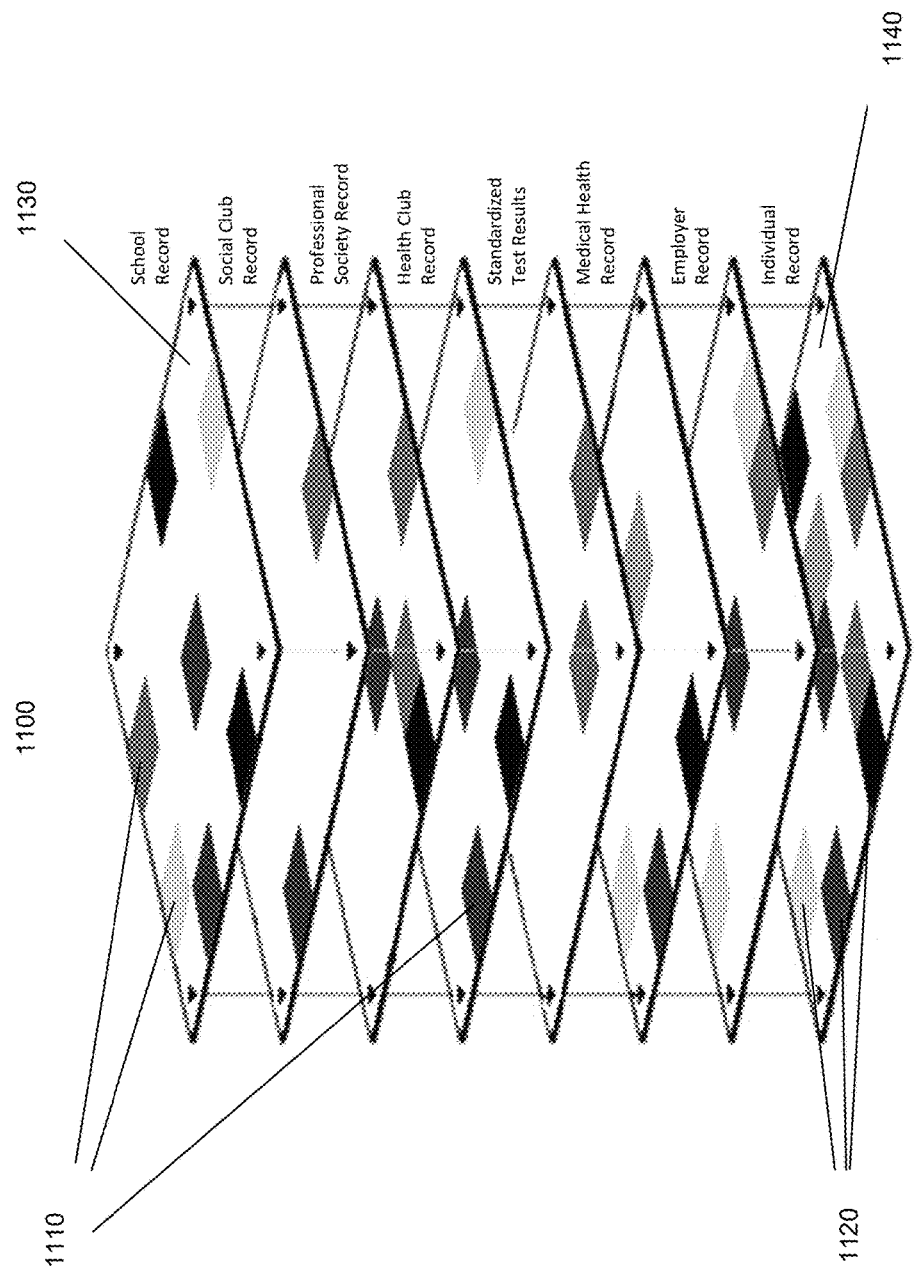
FIG. 5A is a one-way data flow according to an embodiment of the invention.

FIG. 5A is a one-way data flow according to an embodiment of the invention. As seen in FIG. 5A, each user may have many different layers of data associated with their account. The lowest layer 1140 may store the virtual representation of the individual and may contain a copy of all data written into the individual's account. Each individual's account may contain a large number of PAs 1120. Each PA may describe one aspect of the individual's behaviors, tendencies, preferences, knowledge, skills, personality, or abilities. When combined in the individual record 1140, these PAs may provide a meaningful approximation of the actual individual that the data describes.

If a particular user is associated with one or more organizations that invest in that individual by providing access to specific learning or tracking applications, each of those organizations may set up organizational records for the individual. Organizations may be virtually any entity that includes the individual user as a member and that also provides (paid or unpaid) access to software applications for the benefit of the individual. The example of FIG. 5A shows seven different organizational records, such as the School Record 1130. Each of these organizational records contain PA values 1110 that may be captured by applications that are sponsored by that particular organization for the benefit of both the individual and the organization, as discussed above. As can be seen in FIG. 5A, there may be many different organizations with a wide variety of purposes and interests associated with a single individual user. Some of these organizations will be interested in storing and tracking unique PA values that are only of interest to the application suite provided by those particular organizations. However, there may be other organizations that will sponsor applications that store and retrieve PA values that applications sponsored by other organizations may also be storing and retrieving.

The captured data may be visualized as a stack of two-dimensional planes subdivided into a grid of PAs as shown in FIG. 5A. Each PA 1110 may have a specific location within each organizational record. Thus, all the PAs 1110 in a single vertical column across organizations may represent different values for the same PA 1110. For example, one organization may regard an individual's fluency in a foreign language as "beginner" level, while another may regard the individual's fluency in the same language as "intermediate" level, depending on the standards of each organization. Each new instance of a PA value may be stored according to the process described in FIG. 6.

Figure 6:
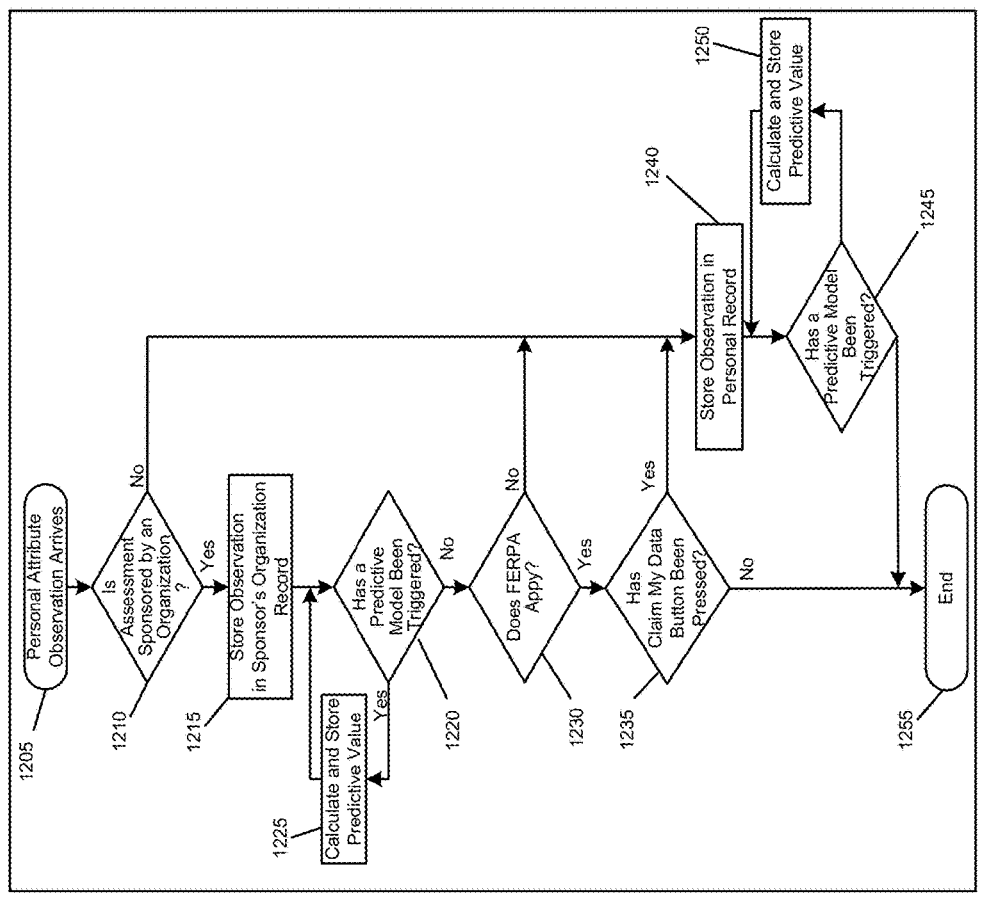
FIG. 6 is a flowchart illustrating a process for storing data using a one-way data flow according to an embodiment of the invention.

FIG. 6 is a flowchart illustrating a process for storing data using a one-way data flow according to an embodiment of the invention. At 1205, a new PA value may be observed by an application and sent to the system 10, for example via an Application Programming Interface (API). At 1210, the system 10 may determine if the submitting application has been sponsored by an organization for the current individual. It is possible that the application is sponsored by zero or more organizations. If it has been sponsored by zero organizations, the data may be assumed to be strictly for the benefit of the individual user and not derived from the efforts or investments of any organization that has established an organizational record for the individual. In this case, at 1240 the data is stored directly into the individual record.

If the application that captured the PA data is in fact associated with one or more organizations, then at 1215 the PA value may be stored in the organizational record of each organization that sponsored the application. If more than one organization has sponsored the same application for the same individual user, all sponsoring organizations may receive the observed data regardless of how the application was launched or where the application resides. In this way, individual learners may receive credit for his/her work without needing to complete tasks in the same application that is hosted on multiple organizational servers.

Once the data is stored in the organizational record(s), at 1220 the system 10 may automatically check the incoming data against any predictive models that have been associated with the affected PA's. If one or more models use the incoming PA value as input, at 1225 the affected models may be executed and the resulting predicted PA values may be updated in all affected organizations (see the "Predictive Analytics and Modeling" section below for more details). The results of predictive models may operate just like observed PA values and may be automatically stored in all organizational records that have sponsored the application that originally made the PA observation.

At this point, all sponsoring organizational records may have been updated with the new observation and all the predictive side-effects related to that initial observation. Now the system 10 may use one-way gates to automatically drag that new data down into the individual record so that it may be used and shared in any way the individual wishes. However, before that can happen, in some embodiments the system 10 may first check to see if the data is subject to the Family Educational Rights and Privacy Act (FERPA), which restricts the sharing of data captured by applications or organizations that receive funding from the United States government, at 1230. If the data comes from any source that is not subject to FERPA regulation, the data and all derivative predictions may be copied into the individual record at 1240.

If the incoming data is subject to FERPA regulations, the system 10 may require the legal parent or guardian of minors to explicitly claim the data for personal use. The process, known as "Claim My Data" may be required once in order to authorize the ongoing automatic migration of incoming PA values through the one-way gates down to the individual record where the individual owner of the data may use it for his or her benefit. For example, data captured from applications that have been sponsored for an individual under the age of 18 by a school or educational institution that has received funding from the United States Department of Education, cannot be shared with any other entity (including the individual record of the student that data describes). The system 10 interface may include a "Claim My Data" button or option that, when clicked or selected, may produce an electronic form that may be used to submit authorization to share data between various organizations and the individual record within the invention. When a parent, guardian, or eligible student uses the "Claim My Data" form and specifies the particular organizations involved, data from applications that are sponsored by those organizations may automatically be migrated through the one-way gates and flow from the organizations down to the individual record where it can be used for the individual's benefit. If the incoming data is subject to FERPA regulations, at 1235 the system 10 may check to see if appropriate authorization has been completed. If authorized consent has been provided, the data is stored in the individual record at 1240. If authorization to waive FERPA restrictions has not been granted, the incoming data may not be stored in the individual record and will remain solely within the organizational records; and the process may end at 1255.

If the incoming data makes it through all the one-way gates, it may be stored in the individual record at 1240, and any predictive models that have been associated with the PA's at the individual record level may be triggered at 1245. At 1250, each model may be executed in turn and appropriate predictive values may be added to the individual record. Once all of these predictive models has completed, the process may end at 1255.

Two-Way Data Flow

By default, each user's performance attributes may be segregated in separate organizational records, and the system 10 may use the one-way gates to project all the data stored in all those organizational records onto the individual record. Thus, the individual record may contain the values of all PA's that have been observed by any application from any organization. While this projection of the data on the individual record may be very useful when the individual wishes to use an application that is prepared to read those PA's and adapt its user experience, there may be many more applications that could use the data but are only available via a sponsored application from one of the organizational records associated with the individual user.

Returning to the example of the reading level assessment mentioned earlier, assume that a user is attending a school that has setup an organizational record for the individual and that the school has sponsored (among other things) a reading tutor that is capable of accurately assessing the user's reading level. Now further assume that this same individual is a member of a professional society dedicated to the topic of electrical engineering, and that her membership includes access to an intelligent tutor that teaches members the basics of electrical circuits and electron flow through closed circuits.

The intelligent tutor may be capable of adjusting the presentation of the learning material based on the reading level of the individual student who is using the intelligent tutor. Consequently, students with lower reading skills receive the educational material with longer descriptions that use smaller words, while students with higher reading levels receive more concise textual material that uses the power of advanced language to convey key concepts quickly and accurately with fewer, but more complex words.

The electrical engineers who created the intelligent tutor to convey the learning material on electrical circuits may not be qualified to also build an accurate tool that is capable of assessing each user's reading level. Therefore, the intelligent tutor may need a way to use the assessment data produced by the reading tutor made available through the individual's school. Once the electrical tutor knows the reading level, it may properly adjust to the individual's needs, but it may be unable to actually see the reading tutor's data because it is stored in a different organization's record.

Figure 5B:
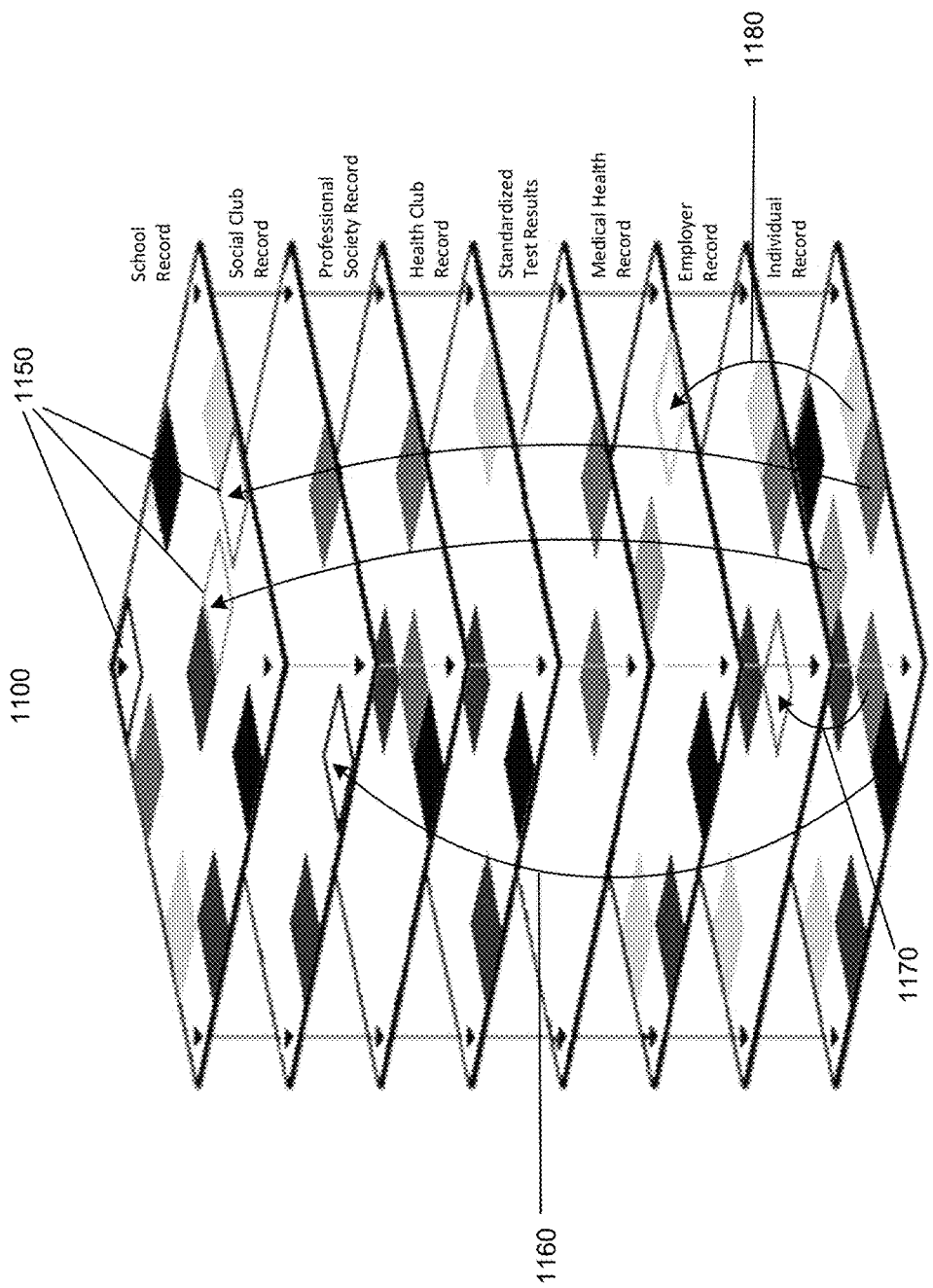
FIG. 5B is a two-way data flow according to an embodiment of the invention.
Figure 8:
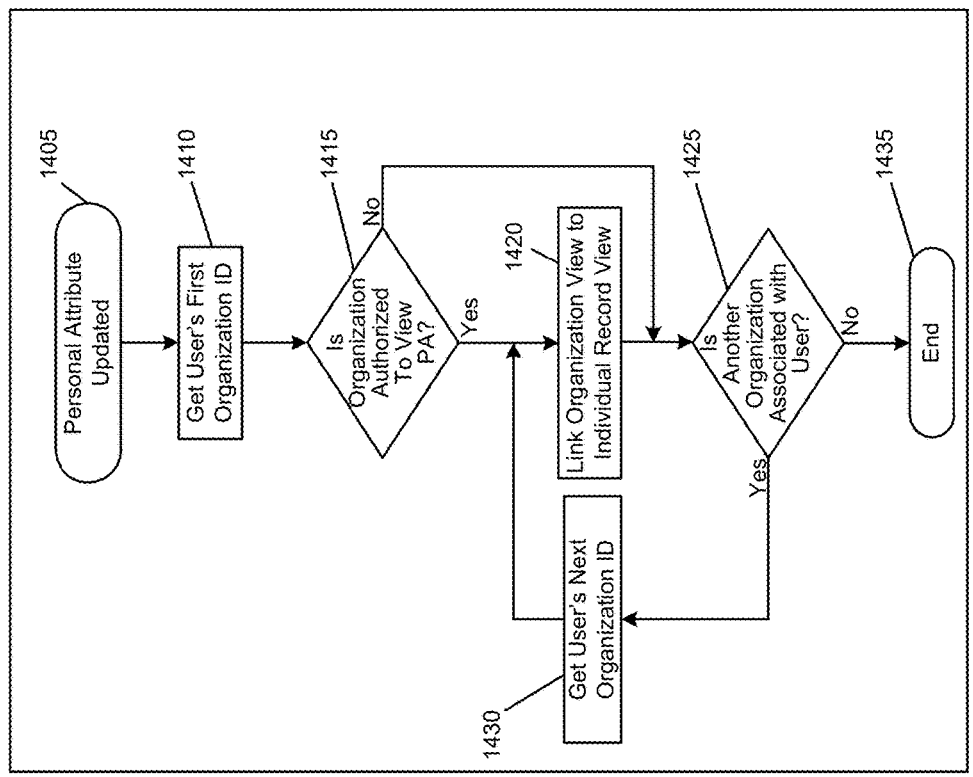
FIG. 8 is a flowchart illustrating a process for reflecting data across organizational views according to an embodiment of the invention.

The optional two-way data flow depicted in FIG. 5B and the flow chart in FIG. 8 may describe how the data may be shared between organizations with the permission of the individual who owns the data. Assuming that numerous observations of personal attributes have been stored in the system using the one-way method previously described, those observations may now be shared with organizations that are not the originating organization. Using permission settings described in greater detail below, personal attribute data may be migrated up the data stack through two-way gates that allow selected data to flow from the individual record to targeted organizational records.

FIG. 5B is a two-way data flow according to an embodiment of the invention. In FIG. 5B, the outlined empty squares 1150 represent PA data that has been migrated from the individual record up to one or more organizational records. All of these data items may reside within the individual record and may be moved through the two-way gates 1160 to the organizational records based one or more logical rules that may govern the migration process while preserving the user's privacy and security.

For instance, in FIG. 5B, the user may have taken the same standardized test on two different occasions. The first test may have been administered by a professional society of which the user is a member. The second test may have been administered by a standardized testing organization. In both cases, the results may have been stored in both organizations' records (because those organizations sponsored the testing application), and the results also may have migrated through the one-way gates into the individual record. However, the user's employer may have indicated that it would like to see the results of that standardized test in order to more effectively provide ongoing educational resources to the individual.

In order to accomplish this, the test data that resides in the individual record may be moved through a two-way gate 1170 from the individual record to the user's employer record. Along the way, the privacy rules within the two-way gate may be checked to ensure that user is willing to share the test data with her employer. If not, the privacy filter in the two-way gate may prevent the data from flowing back to the employer record, and the employer may never even know that the standardized test data exists.

A similar scenario may occur with certain healthcare data originally obtained from the user's school record and her health club record. Once the data reaches the individual record via the one-way gates, it may be made immediately available to the user's medical health record via another two-way gate 1180. Each individual PA and each organization may be subject to customized security and privacy logic rules that determine whether data from the individual record may flow back up to organizations or not.

FIG. 8 is a flowchart illustrating a process for reflecting data across organizational views according to an embodiment of the invention. In this process, the two-way gate may reflect data from the individual record to all the organizational records that qualify to view them. At 1405, a personal attribute may be updated in the individual record. The system 10 may loop through a list of organizations that are associated with the individual to determine which of them should be able to view the new data.

At 1410, the system 10 may identify a first organization, and at 1415 the system 10 may execute the permissions rule set to determine if that organization is authorized to view the PA. If not, the process may skip the next action, otherwise the PA data may be linked (e.g., copied to) the organizational record that matches the organization ID at 1420. At 1425, the system 10 may check to see if other organizational records are attached to the user. If so, at 1430 the next organization ID may be fetched, and the process may repeat from 1415. If no other organizations are attached to the individual, the process may end at 1435.

Permissions Setting via Risk Tolerance Assessment

The system 10 may employ a semantically intelligent security and privacy risk tolerance assessment using a series of specialized tools to elicit detailed information about the user's attitudes toward sharing information in various contexts. The user model 17 may be responsible for carrying out these assessments. Based on the results of that assessment, the system 10 may automatically classify the user into one of many different security profiles that automatically set sharing permissions for all PA values categorically.

Figure 7:
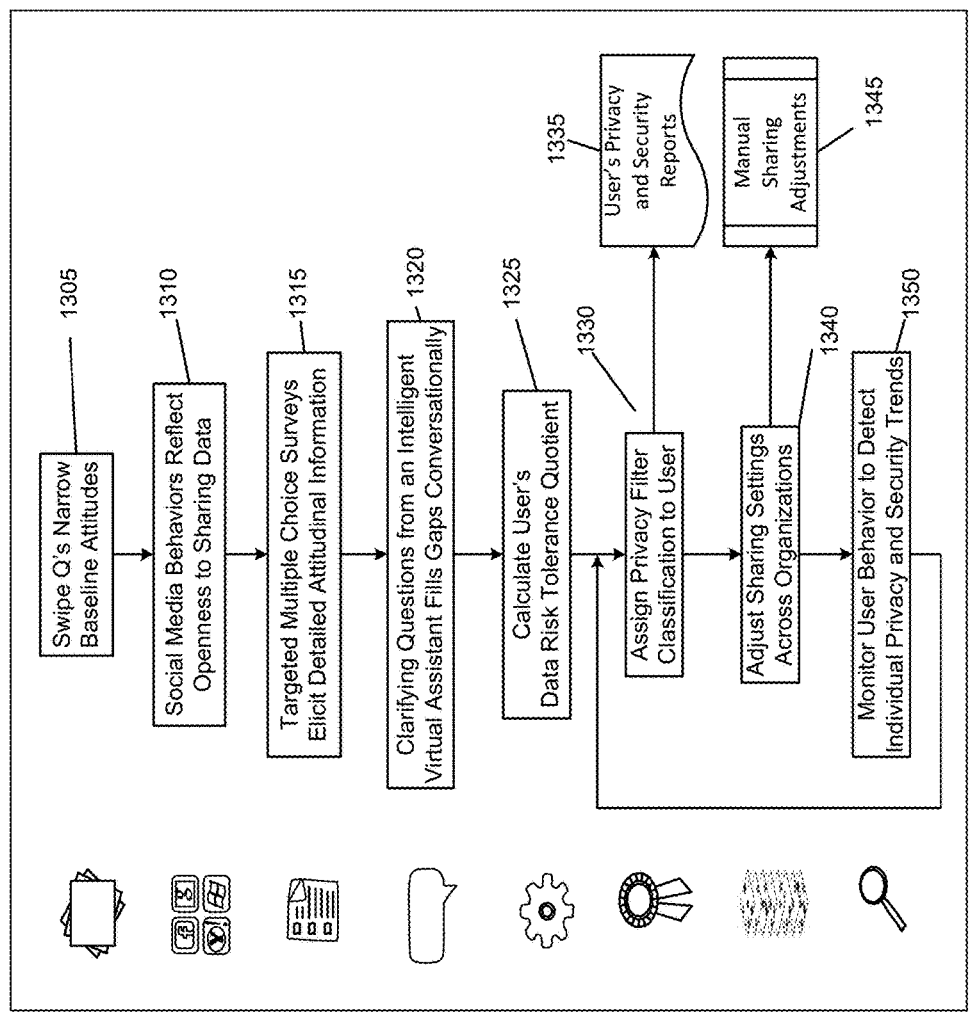
FIG. 7 is a flowchart illustrating a process for permission settings via risk tolerance assessment according to an embodiment of the invention.

FIG. 7 is a flowchart illustrating a process for permission settings via risk tolerance assessment, along with tools which may allow each user to manually adjust the generated settings if desired, according to an embodiment of the invention. The process may use a combination of elicitation instruments to narrow in on each user's unique view of the world and the security measures that best help them to cope with that world. The process is depicted linearly in FIG. 7, but sequence of events may change in reaction to user responses or values within certain personal attributes in some embodiments. Wherever possible, the system 10 may attempt to work from generalized knowledge to specific, detailed knowledge as it builds its security recommendation.

One general type of elicitation is called Swipe Q's 1305. Swipe Q's may provide a quick and easy method of determining baseline attitudes about a wide variety of topics. The user may be presented with a stack of virtual cards that each contains an image, text, or a combination of image and text that convey a security issue. There may be three possible choices for each card, for example "risky", "safe", and "neutral", but other choices may be possible. In one example interface for a touch screen equipped device, if the user feels the depicted scenario is risky, he may swipe to the left to record that response. If the user feels the scenario is safe, he may swipe the card to the right to indicate that choice. When the user cannot decide, swiping straight down will record "neutral". With each swipe, the current card may move off screen in that direction and a new card may be displayed with a new question.

Assessing the user's use and comfort level with established and emerging social media 1310 may indicate the user's willingness to share certain types of information. Since the overall system 10 may benefit by connecting to the user's social media accounts and analyzing the data that is available via API with those organizations, the system 10 may leverage the decisions that users make with regard to social media to inform the algorithms that recommend security settings. For example, the user may provide the system 10 with access to a social media account, and the system 10 may analyze the information to determine what kinds of personal information the user shares and refuses to share.

Once the baseline information about behaviors, attitudes, and knowledge have been completed, targeted multi-choice or Likert-scale questions 1315 may be presented to the user to drill down on specific issues and scenarios that might affect the security and privacy decisions that the user might make. The content of these questions may be dynamically generated to fill in knowledge gaps about the user and to pursue lines of inquiry that require multiple questions to complete a concept.

Some questions may not lend themselves to structured responses. Instead, these questions may be much more conversational in nature 1320 and may result in open ended answers that may require semantic analysis and natural language processing techniques to extract the user's meaning. This type of interaction may be used to close attitudinal gaps by applying sentiment analysis and affective classification techniques, for example. The results of these questions and any other questions may be combined in the data risk tolerance quotient module 1325, which may apply categorical classification and mathematical calculations to users' responses in order to produce a multidimensional proximity matrix used to cluster users into groups of similar people. The following attributes may be used to define a particular user's risk tolerance. Each attribute may be obtained from the user via direct interview questions presented on the screen. Since the response values may be widely varying, each attribute value may be normalized to a value between 0.0 and 1.0, where 0.0 indicates "low" and 1.0 indicates "high." Each may be is associated with a different formula that is used to reduce the complexity of the attribute so that its values map into the normalized range of 0.0 to 1.0. Attributes may include, but are not limited to, the following:

Number of Internet "friends"
Willingness to share income/tax information
Willingness to share health information
Number of email addresses (more than 2 is indicative)
Perceived benefits of sharing various types of data
Age
Perception of control
Culture (location)—different weights for different cultures Each attribute may have its own weight value as well. The weights may be adjusted to increase or decrease the perceived importance of each attribute. Once the weights and mapping functions have been established, the accumulation of risk tolerance scores may be performed according to the following function:

$$\text{bias} = \frac{\sum_{i=1}^{n} w_i v_i}{\sum_{i=1}^{n} w_i}$$

where: $w_i$=weight of the attribute, and $v_i$=mapped value of the attribute.

In many cases, the sum of the weights may equal 1. The sum of the weights multiplied by the values may be divided by the sum of the weights to correct the bias in cases wherein the sum of the weights does not equal 1. The accumulated personal bias may be used in combination with the user's assessment of perceived risk associated with a collection of scenarios to calculate the final risk tolerance.

Scenarios containing some activity or situation may be presented on the screen so that the user can indicate whether the scenario seems risky to them. Different presentation formats may be used, depending on the context of the scenario, but in any case the user may be allowed to indicate their perception of the level of risk associated with the scenario. In addition to being tagged with keyword classifiers to group scenarios, each scenario may be tagged with values for separate risk factors that objectively indicate the scenario's actual risk. Examples shown below may serve as weights in the overall calculation of risk tolerance. If the user is more accepting of actual risk, the risk tolerance quotient may go up. If the user is less accepting of actual risk, then the risk tolerance quotient may go down. Risk factors may include, but are not limited to, the following:

1. Voluntary—Involuntary: Does the user feel they had a real choice to take the risk or not?
2. Immediate Effect—Delayed Effect: Would a bad outcome affect the user right away or only show up over time?
3. Chronic—Catastrophic: Would a bad outcome affect the user a little at a time over a long period, or would it have a large effect in a quick burst?
4. Common—Dread: Could the user learn to live with a bad outcome and think about it calmly, or would a bad outcome cause dread and emotional thinking?
5. Severity: Minor—Fatal How large would the impact of a bad outcome be?
6. Can Be Mitigated: Very Likely—Very Unlikely: Does the user think there is an easy way to prevent a bad outcome?
7. Within Personal Control: Very Likely—Very Unlikely: Does the user think they have the ability to prevent a bad outcome through their personal skills, knowledge, and actions?
8. Risk/Benefit: Very High—Very Low: Does the user believe that the benefit is worth the risk?

Each scenario may receive an accumulated risk score that may be calculated as follows:

$$\text{risk} = \frac{r_1 + (1 - r_2) + r_3 + r_4 + (1 - r_5) + r_6 + r_7 + (1 - r_8)}{8}$$

When a scenario is displayed, the user may select the perceived risk inherent in the scenario by indicating whether the scenario is 1) risky, 2) safe, or 3) neutral. Sorting each displayed scenario into one of these three categories may indicate how risk tolerant the user is. Using the formula below, the risk scores from each category may be averaged and compared to the standard risk score for each category.

$$\text{categorical risk} = \frac{\sum_{i=1}^{n} \text{risk}_i}{N}$$

Ranges for the three risk categories may be:

Risky=1.0-0.6

Neutral=0.59-0.41

Safe=0.4-0.0

For example, if the categorical risk for scenarios that were selected as risky is below 0.6, then the user may have perceived higher risk in the scenarios than the average user would, and thus this particular user may have a lower risk tolerance quotient. If the categorical risk for scenarios that were selected as safe is above 0.4, then the user may have perceived lower risk in the scenarios than the average user would, which may result in a high risk tolerance. While this example references only one categorization process, in some embodiments scenarios may first be segregated into similar contextual groups by keyword tags prior to calculating the categorical risk factor. This extra step may help account for situations where perceived risk changes depending on the context.

Finally, the two risk factors, personal bias and perceived risk, may be used to match the user with other users based on the similarity of these two scores overall. Each group may represent a different type of user with different privacy and security concerns. Security and privacy setting recommendations may be assigned to all PAs and applications based on the particular cluster in which a user is placed 1330. There may be hundreds of different user clusters in the system, each one containing slightly different users with slightly different attitudes about security and privacy.

However, individual users may have a desire to inspect and potentially modify the recommended security and privacy settings. The user's privacy and security reports 1335 may allow the user to view the recommended settings either categorically via several pivot tables that stratify the data in numerous ways, or via an extensive drill-down method on application, personal attribute, or recommended privacy setting, or in some other fashion. By drilling down on any of these measures, the user may see attributes and applications that are affected by the recommendations. If adjustments are desired, automated categorical adjustments may be made by adjusting sliders associated with major dimensions of security and privacy 1340, for example. Users may also choose to use the system's manual sharing adjustments tool 1345 to locate specific applications or personal attributes and set their permissions manually.

Regardless of how the security and privacy settings are established, they may provide a starting point for the risk tolerance assessment. As a user continues to use the system 10 to learn new material, launch applications, share information and adjust permission settings, etc., the system 10 may continue to monitor and learn about the user 1350 and may automatically suggest potential adjustments to the security and privacy settings. This monitoring and adjustment cycle may continue for the life of the user account.

Contextual Risk Tolerance

When humans make decisions about which information they will share with others, they may individually consider details such as who will see the information, how the information will be used, how trustworthy each entity in the transaction is, and how long the information will be kept after it has been used for its original intention. The system 10 may apply security and privacy filters based on the permission setting recommendations and adjustment tools described above to consider such details. FIG. 9 is a block diagram describing how permission settings control data sharing according to an embodiment of the invention. As an example of the way these filters may work, FIG. 9 shows a subset of applications that a particular user may use to help him manage his health and wellbeing. He uses four different applications to manage different aspects of his health. The applications used in this example are purely fictitious and are intended solely to provide the background for the data sharing example. No connection with any existing application is intended.

The four applications are:

Health Tracker 1505—A general purpose quantified self journal and assessment application that allows users to track numerous aspects of general health and wellbeing, including diet, exercise, personal habits, bio-statistics, and high level mental states over time. This is an independent application that the user discovered and purchased himself.

Fitness Buddy 1510 and 1515—An exercise oriented fitness application that helps users manage their exercise plans, cross training, recovery times, and basic body chemistry. This application has been provided to the user, free of charge, by his health club as part of his membership benefits. The application has also been provided by the user's employer as a benefit that also happens to reduce his employer's insurance costs if the captured data shows that employees become more active if they track their workouts.

Restaurant Finder 1520—A search engine application that helps users find restaurants and food services based on community reviews and the particular needs of each user related to allergens, tolerances, and preferences. This application was provided by the user's health club as another benefit of his membership.

Virtual Doctor 1525—A convenient helper application that is provided by the user's health care provider. The application assists the user in making appointments when needed and also provides automated advice nurse and triage services, along with direct access to medical professionals when needed.

Together, these four applications may provide all the services that this particular user needs to effectively manage his health and wellbeing, but to accomplish that goal, those applications may need to share data about the user. However, as a result of the system's Risk Tolerance Assessment 1535, the system 10 has learned that the user is not comfortable sharing all his health data with each and every one of these applications in this example. Therefore, permission settings may be established to control the flow of data between applications so that each application receives exactly what it needs to effectively service this individual user, but no application receives more than it needs to know in order to complete its mission.

The process may start when the user enters health data into the Health Tracker application 1505. Among other things, the user enters the following data in this example:
Weight
Height
Body Mass Index
Blood Pressure
Cholesterol Levels
Respiration Rate at Rest
Respiration Rate under Stress
Pulse Rate at Rest
Pulse Rate under Stress
Hydration Statistics
Dietary Issues (Allergies and Tolerance Issues)

When the user updates his information, that data may be sent to the user's personal record in the user model 17 for later use. During the storage process, the security and privacy one-way and two-way gates may be executed 1530, as described above. The data may be stored in the personal record 1545, and the security rules that were derived in the user's risk tolerance assessment 1535 may be applied to the incoming data to assign appropriate permissions to each individual piece of data that has been received. The user's individual responses to categorized risk scenarios as described in the previous section may drive the decisions related to which security rules are invoked. The resulting security and privacy classifications 1540 may be applied to ensure that each application only receives information that the application needs and only the information that the user is comfortable sharing with each combination of application and sponsoring organization.

Later, when the user goes to his health club to work out, he uses his Fitness Buddy application 1515 to get help planning his workout. Since the user realizes that the most effective type and duration of his workout is often dependent on factors like his recent workout history, his weight, and parts of his blood chemistry, he is willing to share that information 1555 with the Fitness Buddy at the health club 1515. However, he sees no reason to share information about his food allergies or intolerance to certain foods with the health club. Thus, he manually adjusts the permissions for this application so that food information is not transmitted to the Fitness Buddy when that data is requested.

In order to receive small price breaks on health insurance premiums through his employer, the user has agreed to participate in a Fitness Buddy program at work 1510. This is the same application that he uses at his health club, so all the data the insurance company needs is readily available. However, since the incentive program only requires a workout history to confirm a more active lifestyle, and since the user showed concern about sharing personal information with his employer during the permission setting exercise (described in the previous section) the user model 17 indicates that the user might feel that his higher than normal cholesterol might impact his employee insurance benefits. Therefore the system 10 decides that the employer sponsored instance of Fitness Buddy does not have a high enough benefit-to-risk ratio to share this detailed health information with the employer and insurance company. Consequently, the health care data associated with the user's employer organization record is limited to the workout history of the user 1550. No other information is available when using the employer's instance of the Fitness Buddy application.

After leaving the health club, the user launches his Restaurant Finder application 1520 to find a good location for dinner. That application is capable of using quite a bit of personalized data to make recommendations, but the user has conveyed to the system, via the Risk Tolerance Assessment 1535, that he is only comfortable giving his food allergies and tolerance issues to food-related applications. So in this case, the application's request for data about the user is filtered down and only returns the facts that the user needs gluten-free meals and that he has an allergy to shellfish 1560. All other requested information is suppressed by the rules established during the Risk Tolerance Assessment.

The final application in this subset of applications is the Virtual Doctor application 1525 that is made available by the user's medical team at his health care provider. This application requests to see all the available medical and health related information about the user. Since the user indicated that he has an open and free dialogue with his doctors, the permission settings for this application when offered by his health care provider allow a free exchange of all medical and health data 1565 in order to ensure the best possible medical care.

As shown in this example, the type and amount of personal attribute data that each application receives may be entirely dependent on the results of the user's Risk Tolerance Assessment, and that assessment may be sensitive to the fact that the user might not be willing to share the same information with the same application in different contexts. Since the Fitness Buddy was being used in two different contexts (health club and employer), the security and privacy rules may automatically adjust which data can be released in each context. Even in cases where the same organization has sponsored multiple applications, like the health club's Fitness Buddy 1515 and Restaurant Finder 1520, the context of each application's usage may dictate different levels of trust and willingness to share certain types of information. The same may be true when distinguishing between different contexts where separate categories of applications request similar data. The user's responses to the Risk Tolerance Assessment may drive the system's decisions on what to release to each application. The specific context of each data usage may inform the data sharing decision process, similar to when humans make information sharing decisions on a daily basis.

Predictive Analytics and Modeling

Figure 2:
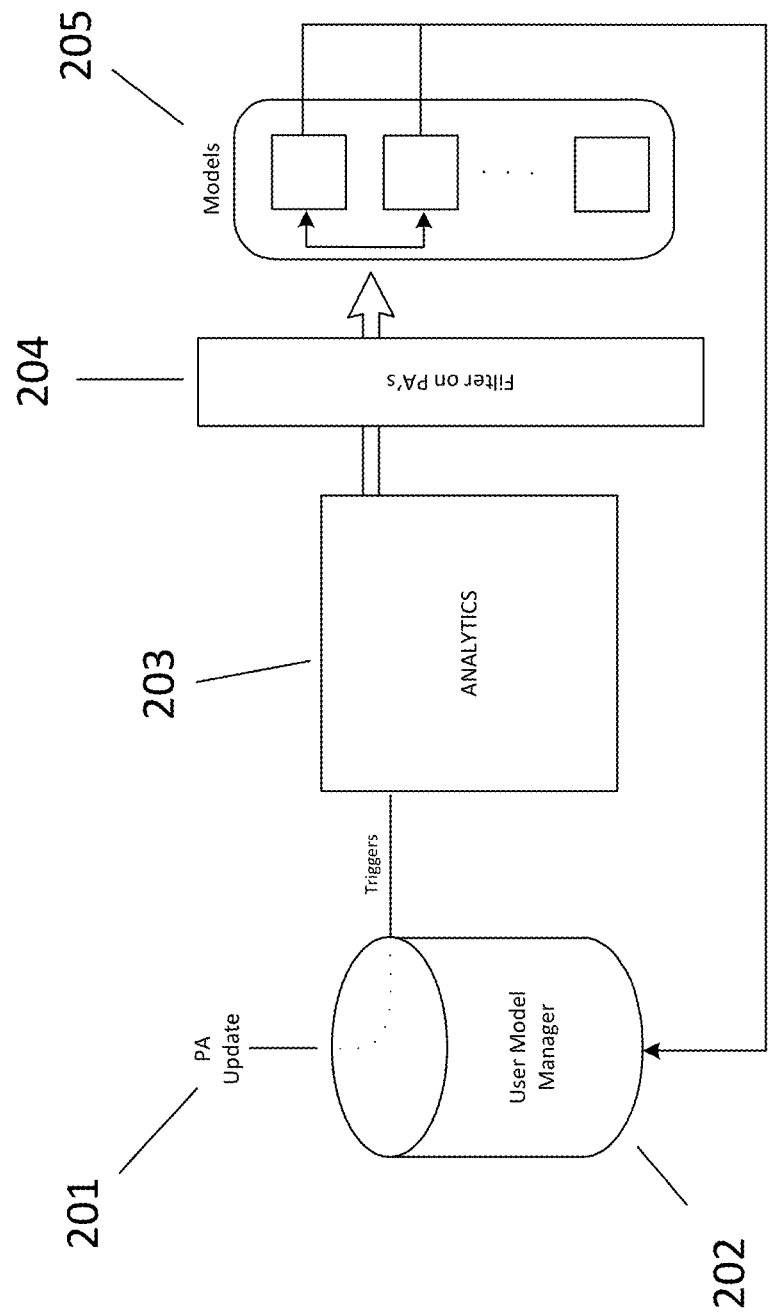
FIG. 2 is a block diagram of an analytics process flow according to an embodiment of the invention.

FIG. 2 is a block diagram of an analytics process flow according to an embodiment of the invention. In some embodiments, the user model 17 may represent low-level attributes, which may be combined in numerous ways to provide higher, performance-level attributes. When new observations of a user are made by an application 14-15, the platform 16 may analyze those observations and draw predictive conclusions about what those observations may mean. When a new PA observation 201 arrives at the user model 17, user model 17 may access a user model manager database to assess which analytic events may be related to the observation 202. The user model 17 may trigger one or more analytic events 203 in the analytics processors 20 based on the assessment. The analytic events may be associated with many different potential predictive models. Since not every predictive model will be affected by a change to a particular PA, the plurality of available predictive models may be filtered 204 by the user model 17 to only include predictive models that are affected by the input PA. The user model 17 may access data provided by the PA directory 18 to determine which models are affected by the new PA observation. The analytics processors 20 may then apply the filtered predictive models 205. Each selected model may react to the new observations by performing potentially many different calculations that leverage relationship graphs between personal attributes to determine predictive scores and confidence factors for each related attribute.

Figure 3:
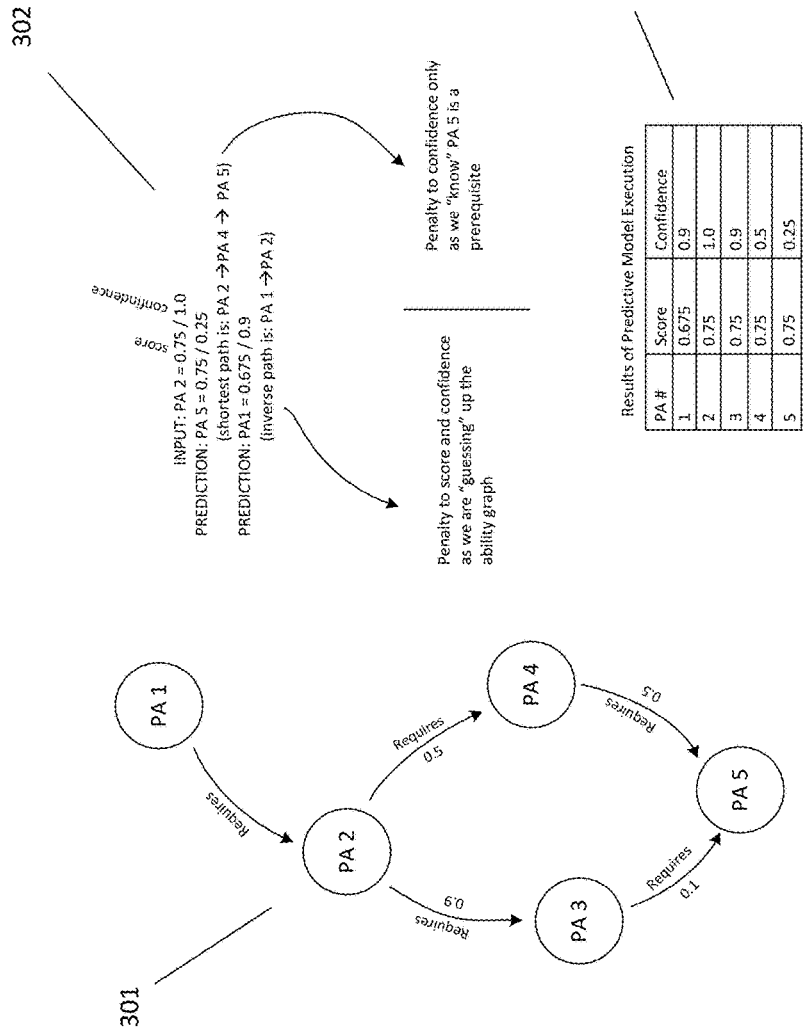
FIG. 3 is an analytical model process flow example according to an embodiment of the invention.

FIG. 3 shows a simple model 301 that may be capable of predicting scores for four different PAs based on the observed score of a single PA. As depicted in 302, the input parameter for the example is the direct observation that PA 2 has been observed with a score of 0.75 and a confidence factor of 1.0. Scores may be normalized to a value between 0.0 and 1.0 in some embodiments. In this case, the user was only able to demonstrate three-quarters of the skill(s) represented by PA 2 (e.g., the user answered 75% of a test's questions correctly, scored in the 75th percentile in a skills assessment, etc.); hence the score of 0.75. However, the user has been able to demonstrate those skills consistently and has therefore received a confidence value of 1.0, which means that the user can always perform the associated tasks.

In the directed graph of the model 301, the arrow heads indicate that PA 2 has two prerequisites, PA 3 and PA 4. Prerequisites may function such that if a user is able to demonstrate some level of skill in a PA, there may be a known probability that the user must have a known level of skill in a prerequisite PA. For example, if a user is able to dunk a basketball, it is highly likely that the user can jump high enough to reach the rim of a basketball hoop. Since PA 3 and PA 4 are required in order to be able to perform PA 2 in this example, it can be assumed that each of those prerequisite PAs has a value at least as high as PA 2. The confidence factor for each possible prerequisite is multiplied by the confidence factor for PA 2 to yield confidence factors of 0.9 and 0.5 for PA 3 and PA 4, respectively. Then, the same process may be used to calculate the scores and confidence factors for any prerequisites of PA 3 and PA 4. In this case, there is only one prerequisite for each, and it happens that it is the same PA 5. So, a value for PA 5 is calculated twice, once using the score and confidence factor from PA 3 and once using the values from PA 4:

$$PA5_{score}=PA3_{score}=0.75$$

$$PA5_{conf}=PA3_{conf}*0.1=0.9*0.1=0.09$$

$$PA5_{score}=PA4_{score}=0.75$$

$$PA5_{conf}=PA4_{conf}*0.5=0.5*0.5=0.25$$

Since the highest confidence factor of the two possible paths is 0.25, the best path between PA 2 and PA 5 goes through PA 4, so the final score for PA 5 is 0.75 and its confidence factor is 0.25.

Similarly, the score and confidence factor for PA 1 can be calculated from the direct observation of PA 2, but in this case PA 2 is a prerequisite of PA 1. Thus, both the confidence factor and the score are penalized during the calculation as shown below:

$$PA1_{score}=PA2_{score}*0.9=0.675$$

$$PA1_{conf}=PA2_{conf}*0.9=1.0*0.9=0.9$$

Consequently, there is a 90 percent chance that the user can properly perform 67.5% of the skills required for PA 1. The variation in PA scores (from 0.75 to 0.675) accounts for the likelihood that new skills are associated with PA 1 that are not present in PA 2, and the confidence factor is adjusted downward because the estimate of probability is the product of the two confidence factors. The table 303 shows the calculated scores and confidence factors for each PA.

As a practical example, if an application observes that a user has mastered the ability to "write a function that describes the relationship between two quantities" and has also mastered the ability to "determine an explicit expression, a recursive process, or steps for calculation from a context", then there may be a high probability that the user has mastered the higher-level personal attribute of "building mathematical functions". Furthermore, once the prediction for this high-level PA has been made, it may be used as an observation in another analytical model that combines "building mathematical functions" with values representing the user's capabilities in the areas of "properties of circles" and "expressions and equations" to predict the user's probability of performing algebraic math problems. This simple example may be visualized in a hierarchy of attributes:
algebraic math
expressions and equations
properties of circles
building mathematical functions
write a function that describes the relationship between two quantities
determine an explicit expression, a recursive process, or steps for calculation from a context
In this example hierarchy, writing a function that described the relationship between two quantities and determining an explicit expression, a recursive process, or steps for calculation from a context are prerequisites for building mathematical functions. In turn, building mathematical functions, expressions and equations, and properties of circles are prerequisites for algebraic math.

The platform 16 may include many different analytical models that may be triggered each time a new observation is sent to the user model 17. The example models discussed above are purposely simple models meant only for explanatory purposes. The platform 16 may contain many different models of widely varying complexity and design, and may involve any number of individual personal attributes and any number of detailed mathematical operations.

Example Use Cases

The following paragraphs describe different example uses of the system 10 according to some embodiments of the invention. The following examples may be applied singly or in one or more combinations with each other.

In one example, the system 10 may be used to tailor third-party applications 14 in a manner that improves user experiences. The user 11 may have a personal user model 17 storing a number of PAs. The user 11 may then allow for a third-party application 14 to have access to portions of data in their personal user model 17. The third-party application 14 may use the attributes to gain an understanding of the user 11. As a result, when the user 11 launches an application 14, the third-party application 14 may make appropriate changes to tailor the presentation of material specifically for the user 11. For example, the third-party application 14 may react to and present information and tasks in the application 14 that are at an appropriate level for a person with the user's PAs. The third-party application 14 may also track the user's history when using applications 14-15 and submit tendencies, performance, and other data back to the system 10. The user model 17 may again track the user's tendencies, performance, and other data and update the user's personal genome data.

In some embodiments, the above example is used in teaching applications. Third-party applications 14 may create performance enhancement environments in the form of learning courses. A user's attributes may be accessed by the third-party applications 14 as the user 11 performs different tests (i.e., assessment instruments) in the learning courses. Competencies assessed by the third-party applications 14 may be defined by the system 10 and individual attributes in the user's personal user model 17 may be created to store the competencies. Output data from the learning courses (scores, assessments, etc.) may be analyzed by the Analytics Processors 20, assigned to the corresponding attributes in the user's personal user model 17, and later accessed by third-party applications 14 for further testing.

In another example, a third-party application 14 or the system 10 itself may query the system 10 to search a user's individual user model 17 and automatically suggest to the user specific applications 14-15 that target specific data elements that are not currently represented in the user's individual user model 17 or which may have changed since the last time the user 11 was assessed on the specific topic (e.g., due to a long period of inactivity).

Further to the above example, the system 10, either independently or with a third-party application 14, may perform user-authorized internet searches for information related to the user 11. The system 10 may then store such information, alert the user 11 of such available information and the source of such available information, and/or perform other user-authorized tasks such as automatically deleting the user's information from the source or requesting that the information be hidden. For instance, the system 10 may use information from social networking sites to update the user's personal attribute data. The user 11 may be given the option (e.g., at system start-up) to authorize the system 10 to search the social networking sites and other websites and update the user's personal genome data accordingly. Also, when the user 11 enters their phone numbers into the user model 17, they may have the option for the phone numbers to be placed on a global "do not call" list. If authorized by the user, the system 10 may, as a background task, search the internet to ensure the user's phone numbers are not publicly available. In addition, the system 10 may search for users' credit ratings available on the internet through different sources, if authorized by the user. The system 10 may alert the user 11 of the different sources and what credit ratings are made available through each source.

In yet another example, the system 10 may be used to collect and produce detailed human behavior, knowledge, skills, and attitudinal data related to anonymous users suitable for corporate and academic research efforts. The system 10 and/or a third-party application 14 may select specific research populations of users 11 and extract targeted data elements (e.g., raw or aggregated data) from the selected research populations. The users 11 may have the ability to specify which data elements may be extracted, either in their entirety (i.e., as raw data) or in an aggregated form, prior to the data being released for the research efforts. In addition, users may receive monetary payments or in-kind value transactions for releasing their data. Such payments may be tracked and managed by the system 10 or the third-party application 14 receiving and assessing the data.

In another example, a third-party application 14 may interact with the system 10 to act as personal agent to assist a user 11 in making personal and/or professional decisions based upon the content of the user's personal user model 17 and/or any available third-party information. The application 14 may capture events and knowledge about user's activities and then provide advice and recommend next actions based on the captured knowledge in the fields of learning, education, training, performance and/or job support. The application 14 may further apply intelligence to the personal user model 17, and provide guidance and recommendations to the user 11 based upon the available data in the user model 17. The system 10 may reference to a competency, a professional activity, and a performance of the professional activity, then provide a mapping relation between the professional activity and the performance and a mapping relation between the performance and the competency. A formal assessment thus may be conducted for the competency based upon the identified performance of the activity. The application 14 may determine a formal rating of the activity, and which expected performance would better improve targeted competency. The application 14 or the system 10 may also provide advice based on inferences determined by the mapping relations.

Further to the example above, a third-party application 14 can interact with the system 10 to act as personal agent to assist a user 11 in making decisions in leisure and everyday activities, such as at a retail store, a museum, a travel website, etc.

In the retail store example, the user can access their user model 17 on their mobile device(s) and visualize and decide which information from their personal attributes that they want made available to a clothing store (e.g., measurements, shoe size, shirt size, personal style preferences, previous clothing-type transactions, other related transactions, etc.). A third-party application 14 associated with the clothing store may include a scanner or reader and the user's mobile device may provide a visual bar code. The visual bar code may include a temporary pass code which may be interpreted by the scanner or reader. The third-party application 14 may then use the temporary pass code to access the personal attribute information which was made available by the user 11. The third-party application 14 may then assess the available personal attribute information and make suggestions to the user 11 based on the assessment, such as items they may be interested in, specific areas of the clothing store that would include items they may be interested in, sales on items similar to items they have recently purchased, etc. This information may be made available to the user through an application computer (e.g., at a kiosk at the clothing store, which may also include the scanner or reader) or through the user's phone (e.g., the third-party application 14 may send the information directly to the user 11 through an e-mail or SMS message or through a hosted application 15). If the user 11 purchases any items at the clothing store, the third-party application 14 may submit the transaction details to the system 10 for updating the user's personal genome data. The user 11 may later view the transaction details and may have the option to delete the details from their user model 17.

Retail stores that are "user model-enabled" may allow a better shopping experience for users. Users may also enhance their user model by shopping at user model-enabled retail stores since their transactions may be tracked and added to their user model. In addition, because the user's individual user model 17 may store all of the user's information and transaction histories, purchases from one store may be used to improve the user's shopping experience at a different store. For example, a third-party application 14 associated with a book store in a mall may use transactional data from a user's online book purchases as well as purchases from the specific book store to perform a better overall assessment of the user's reading preferences, rather than only using the user's transaction history from the specific book store.

In the museum example, the user may access their user model 17 on their mobile device(s) and visualize and decide which information from their personal attributes that they want made available to a museum (e.g., education, recent travel history, book preferences, general preferences, etc.). A third-party application 14 associated with the museum may include a scanner or reader and the user's mobile device may provide a visual bar code. The visual bar code may include a temporary pass code which may be interpreted by the scanner or reader. The third-party application 14 may then use the temporary pass code to access the personal attribute information which was made available by the user 11. The third-party application 14 may then assess the available personal attribute information and make suggestions to the user 11 based on the assessment, such as attractions they may be interested in. In addition, the third-party application 14 may act as a virtual museum tour guide to create a tour which may be played on the user's phone or a separate device for an enhanced museum experience tailored to the user's educational background and personal preferences.

In the travel website example, the user 11 may allow for a third-party application 14 associated with a travel website to access portions of their personal attribute information (e.g., interests, recent travels, etc.). The third-party application 14 may then assess the user's information and suggest custom travel plans which may be of interest to the user 11.

If the user 11 makes a purchase on the travel website, the third-party application 14 may communicate the transaction with the system 10.

In another example, the system 10 itself or the system 10 interacting with a third-party application 14 may act as a global software agent that constructs affinity groups and interpersonal inferences for each subscribing user 11 based upon similar anonymous user information in the central user model processor 17. The system 10 may provide automatic selection and recommendation of probable items of interest. The system 10 may include a probabilities-based algorithm that anonymously matches similar users 11 to fill gaps in personal attribute based on information stored in the user models 17 for matching users 11. The system 10 may also include a probabilities-based algorithm that recommends actions that will improve users' experiences based on data from similar user and goal-oriented user communities.

Further to the above example, the system 10 may act as a social networking application in addition to interacting with other third-party applications 14. The system 10 may allow users to make certain portions of their individual user model 17 publicly available for other users to view and provide feedback for. Various filters may be applied by the user 11 to their personal attribute data so that different users 11 may see differently aggregated data depending on, for example, relationships or connections with the user 11. Applying the filters to the user's personal attribute data and/or the attribute data of other users may create affinity groups of multiple users grouped together by common attributes. The system 10 may use the feedback from other users 11 to update the user's individual user model 17, when appropriate. For example, an attribute common to the affinity group may be applied to an attribute in the user model 17 when the user has other attributes shared by other users in the affinity group. These suggestions may improve the scope of the user's individual user model 17, thus providing more detailed information about the user for third-party applications 14.

Further to the above example, when executing assessment instruments within applications 14-15, users 11 may view a level of completeness of their user model 17 (e.g., how many attributes they have stored compared to how many attributes are globally available). The users 11 may also invite other users 11 to execute the same applications 14-15 to assess the user 11 or themselves on the same topic.

In yet another example, in addition to including user attributes for assessment instruments, the user model 17 may act as a secure global repository for a user's medical records. An application 14 associated with a specific doctor, clinic, or hospital may be permitted access to the user's medical records upon request. Because records from different doctors and clinics may all be stored in one place, there may be less medical error due to misinformed doctors who have not received adequate medical histories and less paperwork has to be sent from doctor to doctor, etc. Also, when a user 11 receives results of a medical test, the doctor (or hospital or clinic) may give the user the option to have the results saved in their individual user model 17. If approved, an application 14-15 associated with a doctor may communicate with the system 10 to input the user's medical results. The Analytics Processors 20 may sort incoming medical results into appropriate slots in the user's individual user model 17.

It is to be understood that the invention is not limited in its application to the details of construction and the arrangement of components set forth in this description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The preceding discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
  receiving, with a user module executed by a processor coupled to a database and associated with an access-controlled service, a value for an attribute of a user having an account with the access-controlled service;
  determining, with the user module, whether the value is derived from an assessment sponsored by an organization associated with the user, wherein the organization has at least one account with the access-controlled service;
  when the value is derived from the assessment sponsored by the organization associated with the user, storing, with the user module, the received value in the database in a record associated with the user only and inaccessible through the at least one account of the organization and storing, with the user module, the received value in a separate record associated with the organization and the user, wherein access to the separate record by third parties is controlled by the user;

when the value is derived from a source different from the assessment sponsored by the organization associated with the user, storing, with the user module, the received value in the database in the record associated with the user only;

determining, with an analytics processing module executed by the processor, whether the attribute is associated with a predictive model;

in response to determining that the attribute is associated with the predictive model, executing, with the analytics processing module, the predictive model associated with the attribute using the received value to generate a predicted value using a confidence factor;

when the value is derived from the assessment sponsored by the organization associated with the user, storing, with the analytics processing module, the predicted value in the database in the record associated with the user only and in the record associated with the organization and the user; and when the value is derived from the assessment not sponsored by an organization associated with the user, storing, with the analytics processing module, the predicted value in the database in the record associated with the user only.

2. The method of claim 1, further comprising:
determining, with the user module, whether a second organization having at least one account with the access-controlled service is authorized to view the received value; and
when the second organization is authorized to view the received value, storing, with the user module, the received value in the database in the record associated with the user only and in a record associated with the second organization and the user, wherein access to the record associated with the second organization and the user by third parties is controlled by the user.

3. The method of claim 2, further comprising performing, with a data risk tolerance quotient module executed by the processor, a risk tolerance assessment for the user to generate a risk tolerance for the user;
wherein determining, with the user module, whether the second organization is authorized to view the received value comprises:
assigning, with the user module, a privacy filter to the user based on the risk tolerance; and
determining, with the user module, whether sharing the received value with the second organization is allowed by the privacy filter.

4. The method of claim 3, wherein performing, with the data risk tolerance quotient module, the risk tolerance assessment for the user comprises receiving, with the data risk tolerance quotient module, an answer to a risk tolerance question from the user.

5. The method of claim 4, wherein performing, with the data risk tolerance quotient module, the risk tolerance assessment for the user comprises calculating, with the data risk tolerance quotient module, a risk tolerance score associated with the answer to the risk tolerance question.

6. The method of claim 3, wherein performing, with the data risk tolerance quotient module, the risk tolerance assessment for the user comprises monitoring, with the data risk tolerance quotient module, user behavior.

7. The method of claim 3, wherein performing, with the data risk tolerance quotient module, the risk tolerance assessment for the user comprises receiving, with the data risk tolerance quotient module, an adjustment to the risk tolerance from the user.

8. The method of claim 1, wherein executing, with the analytics processing module, the predictive model associated with the attribute using the received value to generate the predicted value comprises calculating, with the analytics processing module, a score and a confidence value for the attribute.

9. The method of claim 1, further comprising determining, with the analytics processing module, whether the predictive model is associated with the attribute.

10. The method of claim 1, further comprising:
determining, with the user module, whether a second organization having at least one account with the access-controlled service is authorized to view the predicted value; and
when the second organization is authorized to view the predicted value, storing, with the user module, the predicted value in the database in the record associated with the user only and in a record associated with the second organization and the user, wherein access to the record associated with the second organization and the user by third parties is controlled by the user.

11. The method of claim 10, further comprising performing, with a data risk tolerance quotient module executed by the processor, a risk tolerance assessment for the user to generate a risk tolerance for the user;
wherein determining, with the user module, whether the second organization is authorized to view the received value comprises:
assigning, with the user module, a privacy filter to the user based on the risk tolerance; and
determining, with the user module, whether sharing the predicted value with the second organization is allowed by the privacy filter.

12. The method of claim 11, wherein performing, with the data risk tolerance quotient module, the risk tolerance assessment for the user comprises receiving, with the data risk tolerance quotient module, an answer to a risk tolerance question from the user.

13. The method of claim 12, wherein performing, with the data risk tolerance quotient module, the risk tolerance assessment for the user comprises calculating, with the data risk tolerance quotient module, a risk tolerance score associated with the answer to the risk tolerance question.

14. The method of claim 11, wherein performing, with the data risk tolerance quotient module, the risk tolerance assessment for the user comprises monitoring, with the data risk tolerance quotient module, user behavior.

15. The method of claim 11, wherein performing, with the data risk tolerance quotient module, the risk tolerance assessment for the user comprises receiving, with the data risk tolerance quotient module, an adjustment to the risk tolerance from the user.

16. The method of claim 1, further comprising receiving, with the user module, permission to store the received value from the user.

17. The method of claim 16, further comprising determining, with the user module, whether user permission to store the received value is required.

18. The method of claim 1, further comprising:
providing, with the user module, a first personalized assessment instrument for execution by the user, wherein an outcome of the first personalized assessment instrument comprises the received value; and
providing, with the user module, the record associated with the organization associated with the user and the user, when authorized by the user, for creating a second personalized assessment instrument for execution by the user.

19. The method of claim 1, further comprising encrypting, with the user module, the received value prior to storing the received value in the database in the record associated with the user only, in the record associated with the organization associated with the user and the user, or in a combination thereof.

20. The method of claim 1, further comprising providing, with the user module, a temporary pass code allowing access to the received value stored in the record associated with the organization associated with the user and the user.

21. The method of claim 1, further comprising assigning, with a directory module executed by the processor, an identifier to the record associated with the user, wherein the user module uses the identifier to locate and access a portion of the record associated with the user.

22. A system comprising:
a database;
a hardware processor coupled to the database and associated with an access-controlled service;
a user module executed by the hardware processor and configured to:
  receive a value for an attribute of a user having an account with the access-controlled service;
  determine whether the value is derived from an assessment sponsored by an organization associated with the user, wherein the organization has at least one account with the access-controlled service;
  when the value is derived from the assessment sponsored by the organization associated with the user, store the received value in the database in a record associated with the user only and inaccessible through the at least one account of the organization and store the received value in a separate record associated with the organization and the user, wherein access to the separate record by third parties is controlled by the user;
  when the value is derived from a source different from the assessment sponsored by the organization associated with the user, store the received value in the database in the record associated with the user only; and
an analytics processing module executed by the hardware processor and configured to:
  determine whether the attribute is associated with a predictive model;
  in response to determining that the attribute is associated with the predictive model, execute the predictive model associated with the attribute using the received value to generate a predicted value using a confidence factor;
  when the value is derived from the assessment sponsored by the organization associated with the user, store the predicted value in the database in the record associated with the user only and in the record associated with the organization and the user; and
  when the value is derived from the assessment not sponsored by an organization associated with the user, store the predicted value in the database in the record associated with the user only.

23. The system of claim 22, wherein the user module is further configured to:
determine whether a second organization having at least one account with the access-controlled service is authorized to view the received value; and
when the second organization is authorized to view the received value, store the received value in the database in the record associated with the user only and in a record associated with the second organization and the user, wherein access to the record associated with the second organization and the user by third parties is controlled by the user.

24. The system of claim 23, further comprising a data risk tolerance quotient module executed by the hardware processor configured to perform a risk tolerance assessment for the user to generate a risk tolerance for the user;
wherein the user module is configured to determine whether the second organization is authorized to view the received value by:
  assigning a privacy filter to the user based on the risk tolerance; and
  determining whether sharing the received value with the second organization is allowed by the privacy filter.

25. The system of claim 24, wherein the data risk tolerance quotient module is configured to perform the risk tolerance assessment for the user by receiving an answer to a risk tolerance question from the user.

26. The system of claim 25, wherein the data risk tolerance quotient module is configured to perform the risk tolerance assessment for the user by calculating a risk tolerance score associated with the answer to the risk tolerance question.

27. The system of claim 24, wherein the data risk tolerance quotient module is configured to perform the risk tolerance assessment for the user by monitoring user behavior.

28. The system of claim 24, wherein the data risk tolerance quotient module is configured to perform the risk tolerance assessment for the user by receiving an adjustment to the risk tolerance from the user.

29. The system of claim 22, wherein the analytics processing module is configured to execute the predictive model associated with the attribute using the received value to generate the predicted value by calculating a score and a confidence value for the attribute.

30. The system of claim 22, wherein the analytics processing module is further configured to determine whether the predictive model is associated with the attribute.

31. The system of claim 22, wherein the user module is further configured to:
determine whether a second organization having at least one account with the access-controlled service is authorized to view the predicted value; and
when the second organization is authorized to view the predicted value, store the predicted value in the database in the record associated with the user only and in a record associated with the second organization and the user, wherein access to the record associated with the second organization and the user by third parties is controlled by the user.

32. The system of claim 31, further comprising a data risk tolerance quotient module executed by the hardware processor configured to perform a risk tolerance assessment for the user to generate a risk tolerance for the user;

wherein the user module is configured to determine whether the second organization is authorized to view the received value by:
assigning a privacy filter to the user based on the risk tolerance; and
determining whether sharing the received value with the second organization is allowed by the privacy filter.

33. The system of claim 32, wherein the data risk tolerance quotient module is configured to perform the risk tolerance assessment for the user by receiving an answer to a risk tolerance question from the user.

34. The system of claim 33, wherein the data risk tolerance quotient module is configured to perform the risk tolerance assessment for the user by calculating a risk tolerance score associated with the answer to the risk tolerance question.

35. The system of claim 32, wherein the data risk tolerance quotient module is configured to perform the risk tolerance assessment for the user by monitoring user behavior.

36. The system of claim 32, wherein the data risk tolerance quotient module is configured to perform the risk tolerance assessment for the user by receiving an adjustment to the risk tolerance from the user.

37. The system of claim 22, wherein the user module is further configured to receive permission to store the received value from the user.

38. The system of claim 37, wherein the user module is further configured to determine whether user permission to store the received value is required.

39. The system of claim 22, wherein the user module is further configured to:
provide a first personalized assessment instrument for execution by the user, wherein an outcome of the first personalized assessment instrument comprises the received value; and
provide the record associated with the organization associated with the user and the user, when authorized by the user, for creating a second personalized assessment instrument for execution by the user.

40. The system of claim 22, wherein the user module is further configured to encrypt the received value prior to storing the received value in the database in the record associated with the user only, in the record associated with the organization associated with the user and the user, or in a combination thereof.

41. The system of claim 22, wherein the user module is further configured to provide a temporary pass code allowing access to the received value stored in the record associated with the organization associated with the user and the user.

42. The system of claim 22, further comprising a directory module executed by the hardware processor configured to assign an identifier to the record associated with the user, wherein the user module uses the identifier to locate and access a portion of the record associated with the user.

43. The system of claim 22, wherein the database is disposed in at least one data store server.

44. The system of claim 43, wherein the hardware processor is disposed in a server in communication with the at least one data store server.

45. The system of claim 43, wherein the hardware processor comprises a plurality of processors including at least two of:
at least one directory processor in communication with the plurality of data store servers and providing access to the plurality of data store servers;
at least one user model processor in communication with the at least one directory processor;
at least one analytics processor in communication with the at least one user model processor;
at least one web processor in communication with the at least one user model processor;
at least one application processor in communication with the at least one user model processor; and
at least one user device in communication with at least one of the at least one web processor and the at least one application processor.

46. The system of claim 45, wherein:
the at least one directory processor is disposed in at least one directory server;
the at least one user model processor is disposed in at least one user model server;
the at least one analytics processor is disposed in at least one analytics server;
the at least one web processor is disposed in at least one web server; or
a combination thereof.

* * * * *